United States Patent [19]
Suto et al.

[11] Patent Number: 6,166,146
[45] Date of Patent: Dec. 26, 2000

[54] CURABLE RESIN COMPOSITION, ADHESIVE COMPOSITION, BONDED PRODUCT, SPEAKER AND BONDING METHOD

[75] Inventors: Hiroshi Suto; Koichi Taguchi, both of Shibukawa, Japan

[73] Assignee: Denki Kagaku Kogyo Kabushiki Kaisha, Tokyo, Japan

[21] Appl. No.: 09/209,288

[22] Filed: Dec. 11, 1998

[30] Foreign Application Priority Data

| Dec. 12, 1997 | [JP] | Japan | 9-342400 |
| Dec. 12, 1997 | [JP] | Japan | 9-342401 |
| Sep. 24, 1998 | [JP] | Japan | 10-269619 |

[51] Int. Cl.[7] ............ C08L 51/00; C08L 51/04; C08L 33/08; C09J 4/02; C09J 4/06

[52] U.S. Cl. .......... 525/255; 525/257; 525/259; 525/263; 525/265; 525/287; 525/302; 525/309; 525/310

[58] Field of Search ................ 525/255, 257, 525/259, 302, 309, 310, 263, 265, 287

[56] References Cited

U.S. PATENT DOCUMENTS

| 4,331,795 | 5/1982 | Ukita et al. . | |
| 4,596,857 | 6/1986 | Doi et al. | 525/255 |
| 5,330,844 | 7/1994 | Taguchi et al. . | |
| 5,859,160 | 1/1999 | Righettini et al. | 526/347.1 |
| 5,863,989 | 1/1999 | Taguchi et al. . | |

FOREIGN PATENT DOCUMENTS

| 61-275206 | 12/1986 | Japan . |
| 62-045509 | 2/1987 | Japan . |
| 63-227508 | 9/1988 | Japan . |
| 63-227509 | 9/1988 | Japan . |
| 63-227510 | 9/1988 | Japan . |
| 63-243009 | 10/1988 | Japan . |
| 1-187457 | 7/1989 | Japan . |
| 2-040310 | 2/1990 | Japan . |
| 4-275204 | 9/1992 | Japan . |
| 6-065327 | 3/1994 | Japan . |
| 2 147 306 | 5/1985 | United Kingdom . |

OTHER PUBLICATIONS

WPI Abstracts, AN 89–232383 [32], JP 1–168776, Jul. 4, 1989.

WPI Abstracts, AN 89–011217 [02], JP 63–286484, Nov. 24, 1988.

*Primary Examiner*—Susan W. Berman
*Attorney, Agent, or Firm*—Oblon, Spivak, McClelland, Maier & Neustadt, P.C.

[57] ABSTRACT

A curable resin composition comprising (1) a polymerizable vinyl monomer, (2) a polymerization initiator, (3) an aromatic amine and/or a pyridine derivative, (4) a β-diketone chelate and/or a β-keto-ester, and (5) a phosphate.

9 Claims, 2 Drawing Sheets

CURABLE RESIN COMPOSITION, ADHESIVE COMPOSITION, BONDED PRODUCT, SPEAKER AND BONDING METHOD

BACKGROUND OF THE INVENTION

1. Field of the Invention

The present invention relates to a curable resin composition containing a (meth)acrylic monomer, which is useful for bonding adherends made of reinforced fibers, metal and/or cotton, preferably for bonding adherends made of reinforced fibers, more preferably for bonding adherends made of aramid fibers. Particularly, it relates to an adhesive composition which is useful for assembling a speaker employing a damper made of aramid fibers.

2. Discussion of the Related Art

The demand for a cold quick-curing adhesive which is curable at a normal or room temperature in a short period of time, tends to increase year after year with a view to labor-saving, resource-saving and energy-saving. Heretofore, as a cold quick-curing adhesive, a two-pack type quick-curable epoxy adhesive, an anaerobic adhesive, an instantaneous adhesive or a second generation acrylic adhesive (SGA) has been known.

The two-pack type quick-curing epoxy adhesive is designed so that a main agent and a curing agent are weighed, mixed and coated on an adherend, whereupon the adhesive cures by the reaction of the main agent and the curing agent. However, such a two-pack type quick-curing epoxy adhesive has had a drawback that if weighing or mixing of the main agent and the curing agent is inadequate, the bond strength is likely to be remarkably low, and even if weighing and mixing are adequately carried out, the peel strength and impact strength tend to be low.

The anaerobic adhesive is designed so that the adhesive composition is pressed between adherends to cut off air for curing. However, it has had a drawback that if a part of the adhesive composition is squeezed out at the time of pressing, such a squeeze-out portion will be in contact with air and will not be cured. Further, it has another drawback that it is not curable when a clearance between adherends is large.

The instantaneous adhesive usually comprises cyanoacrylate as the main component and is excellent in the operation efficiency. However, it has had a drawback that the peel strength or impact strength is low. Further, the moisture resistance or water resistance is poor, whereby the range of its application is limited.

SGA is a two-pack type. Nevertheless, it requires no accurate weighing of the two packs, and it cures at room temperature in a few or a few tens minutes even when weighing or mixing is inadequate, in some cases, simply by contacting the two packs without requiring accurate weighing of the two packs. Accordingly, it is excellent in the operation efficiency, and yet SCA provides high peel strength or impact strength, and curing of the squeeze-out portion is also good. For this reason, it is widely used.

However, such SGA has had a drawback that the adhesion to fibers or cloth is poor, and it tends to hardly adhere to e.g. cloth or paper to be used as a material for the three parts of a speaker i.e. a cone, a damper and a voice coil.

Figure 1:
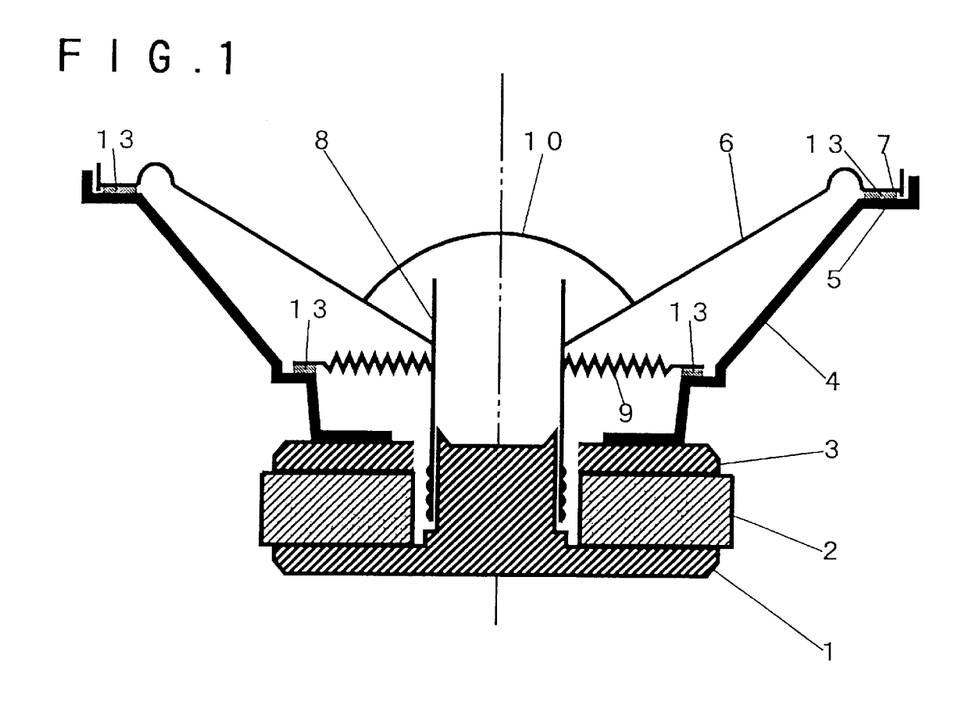
FIG. 1 is a cross-sectional view of a speaker.

Usually, a speaker has a construction as shown in FIG. 1. Namely, a frame 4 is bonded to a field system comprising a bottom plate 1, a ring-shaped magnet 2 and a ring-shaped top plate 3 which are laminated and bonded. To the peripheral portion of this frame 4, the peripheral portion (the cone edge) 7 of a cone 6 is bonded. To the center portion of this cone 6, a voice coil 8 is bonded. The intermediate portion of this voice coil 8 is held by a damper 9, and the lower portion of the voice coil 8 is fitted on the center portion of the bottom plate 1. A dust cap 10 is bonded to the center upper surface of the cone 6.

Figure 2:
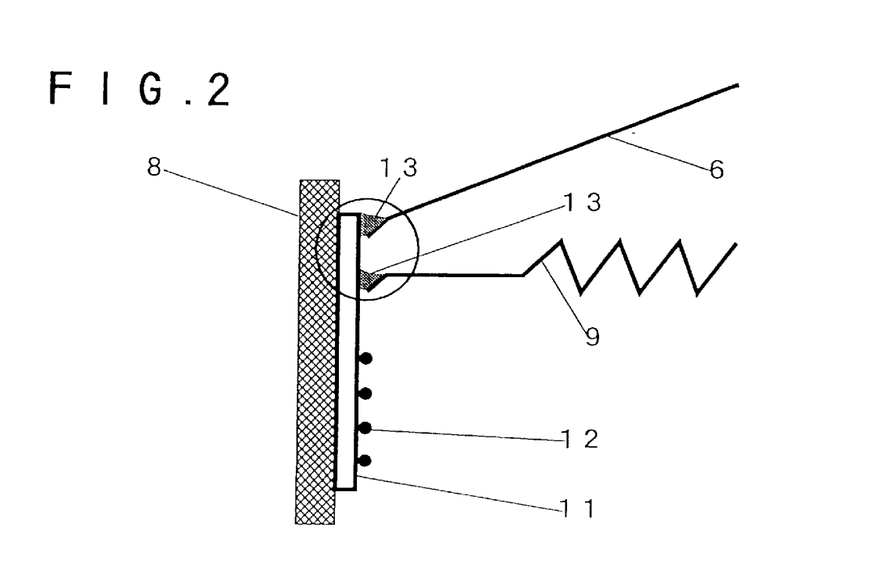
FIG. 2 is a cross-sectional view showing a half of the structure of the three parts of the speaker.

Particularly, bonding of the three parts of the speaker comprising the cone 6, the voice coil 8 and the damper 9 is as shown in FIG. 2. The voice coil 8 has a construction such that a paper tape 11 is wound on the outer circumference of the voice coil 8, and a coil 12 is wound on the outer circumference of the paper tape 11 (in the Figure, the portion identified by a circle is the bonding portion of the three parts of the speaker, and the three parts of the speaker are bonded by an adhesive composition 13).

A speaker is assembled by bonding a hard adherend such as a metal or magnetic material and a flexible adherend such as paper or cloth. In the bonding of the hard adherend and the flexible adherend, particularly when a damper 9 or a cone edge 7 made of paper or cloth is bonded to a frame 4 by an adhesive composition 13, it is required that the damper 9 or the cone edge 7 will not lift from the frame due to warpage from the time before curing after coating and press-bonding.

To satisfy such requirements, JP-B-60-19789 proposes an adhesive composition suitable for a porous or expandable material. By such an adhesive composition, bonding to cloth or paper useful for e.g. the three parts of the speaker, has been made possible.

However, in recent years, there has been an increasing demand for a high power speaker or a speaker to be mounted on an automobile. In the case of a high power speaker, a large quantity of electric current flows in the voice coil, thus leading to heat generation, and in the case of the speaker to be mounted on an automobile, the speaker itself is required to have heat resistance as the interior temperature becomes high during the operation of the engine or in the summer time.

Accordingly, the material to be used for the damper 9 of the speaker is now being changed from paper or cloth to aramid fibers having high heat resistance. Here, the term "aramid fibers" is an abbreviation of "aromatic polyamide fibers".

Therefore, an adhesive composition excellent in bonding to the aramid fibers, has been desired.

SUMMARY OF THE INVENTION

The present inventors have found that by using certain specific components to satisfy this requirement, it is possible to obtain a curable resin composition which is excellent in the adhesion to the aramid fibers, and the present invention has been accomplished on the basis of this discovery.

DESCRIPTION OF THE PREFERRED EMBODIMENTS

Namely, the present invention provides:

A curable resin composition comprising (1) a polymerizable vinyl monomer, (2) a polymerization initiator, (3) an aromatic amine and/or a pyridine derivative, (4) a β-diketone chelate and/or a β-keto-ester, and (5) a phosphate.

A curable resin composition comprising (1) a polymerizable vinyl monomer, (2) a polymerization initiator, (3) an aromatic amine and/or a pyridine derivative, (4) a β-diketone chelate and/or a β-keto-ester, (5) a phosphate, and (6) an elastomer component.

A curable resin composition comprising (1) 100 parts by weight of a polymerizable vinyl monomer, (2) from 0.5 to 10 parts by weight of a polymerization initiator, (3) from 0.05 to 5 parts by weight of an aromatic amine and/or a pyridine derivative, (4) from 0.05 to 5 parts by weight of a β-diketone chelate and/or a β-keto-ester, (5) from 0.05 to 10 parts by weight of a phosphate, and (6) from 5 to 35 parts by weight of an elastomer component.

The curable resin composition wherein (1) the polymerizable vinyl monomer is a (meth)acrylic monomer.

The curable resin composition wherein (1) the polymerizable vinyl monomer comprises a (meth)acrylic monomer of the formula (A) and a (meth)acrylic monomer of the formula (B):

(A)

wherein Z is a (meth) acryloyl group, and $R_1$ is a $C_{1-10}$ alkyl group,

(B)

wherein Z is as defined above, $R_2$ is $—C_2H_4—$, $—C_3H_6—$, $—CH_2CH(CH_3)—$, $—C_4H_8—$ or $—C_6H_{12}—$, $R_3$ is hydrogen or a $C_{1-4}$ alkyl group, and p is an integer of from 0 to 8.

The curable resin composition wherein (3) the aromatic amine and/or the pyridine derivative is N,N-dimethylaniline.

The curable resin composition wherein (4) the β-diketone chelate and/or a β-keto-ester is vanadyl acetylacetonate.

The curable resin composition wherein (5) the phosphate is an acid phosphate compound of the formula (C):

(C)

wherein R is $CH_2$=$CR_4CO(OR_5)_m$— (wherein $R_4$ is hydrogen or a methyl group, $R_5$ is $—C_2H_4—$, $—C_3H_6$, $—CH_2CH(CH_3)—$, $—C_4H_8—$, $—C_6H_{12}—$ or and m is an integer of from 1 to 10), and n is an integer of 1 or 2.

The curable resin composition wherein (5) the phosphate is acid phosphoxyethyl methacrylate.

The curable resin composition which contains substantially no (meth)acrylic monomer having a hydroxyl group.

The curable resin composition which is a two-pack type composition comprising a first pack containing at least the component (2) and a second pack containing at least the components (3) and (4).

An adhesive composition containing the curable resin composition.

A bonded product comprising adherends bonded by the adhesive composition.

The bonded product wherein the adherends are made of reinforced fibers, metal and/or cotton.

The bonded product wherein the adherends are made of aramid fibers.

A speaker wherein the adhesive composition is used.

A speaker comprising three parts, i.e. a cone, a voice coil and a damper, bonded by the adhesive composition.

The speaker wherein the damper is made of aramid fibers.

A bonding method which comprises bonding adherends by means of the adhesive composition.

The bonding method wherein the adherends are made of reinforced fibers, metal and/or cotton.

The bonding method wherein the adherends are made of aramid fibers.

BRIEF DESCRIPTION OF THE DRAWINGS

In the accompanying drawings.

In the figures, reference numeral 1 indicates a bottom plate, 2 a magnet, 3 a top plate, 4 a frame, 5 the periphery of the frame, 6 a cone, 7 the periphery of the cone (cone edge), 8 a voice coil, 9 a damper, 10 a dust cap, 11 a paper tape, 12 a coil, 13 an adhesive composition, 14 a frame fixing jig, and 15 a voice coil tensile jig.

Now, the present invention will be described in detail with reference to the preferred embodiments.

(1) The polymerizable vinyl monomer to be used in the present invention is not particularly limited with respect to its types and structures. However, from the viewpoint of the reactivity and the bonding property, a (meth)acrylic monomer is preferred.

The (meth)acrylic monomer means an acrylic compound selected from (meth)acrylic acids and (meth)acrylic acid esters. The (meth)acrylic monomer includes, for example, the following monomers.

① A (meth)acrylic monomer of the formula (A):

(A)

wherein Z is a (meth)acryloyl group, and $R_1$ is a $C_{1-10}$ alkyl group.

$R_1$ is preferably a $C_{1-10}$ alkyl group, more preferably a $C_{1-3}$ alkyl group. If the carbon number exceeds 10, the surface curing property tends to be low, stickiness tends to be observed, and the curing rate tends to be low.

As such a (meth)acrylic monomer, methyl (meth)acrylate, ethyl (meth)acrylate, propyl (meth)acrylate and isopropyl (meth)acrylate may, for example, be mentioned. One or more of them may be used. Among them, methyl methacrylate is preferred from the viewpoint of a good bonding property and a low price.

② A (meth)acrylic monomer of the formula (B):

(B)

wherein Z is as defined above, $R_2$ is $—C_2H_4—$, $—C_3H_6—$, $—CH_2CH(CH_3)—$, $—C_4H_8—$ or $—C_6H_{12}—$, $R_3$ is hydrogen or a $C_{1-4}$ alkyl group, and p is an integer of from 0 to 8.

Such a (meth)acrylic monomer may, for example, be 2,2-bis(4-(meth)acryloxyphenyl)propane, 2,2-bis(4-(meth)acryloxyethoxyphenyl)propane, 2,2-bis(4-(meth)acryloxydiethoxyphenyl)propane, 2,2-bis(4-(meth)acryloxypropoxyphenyl)propane, 2,2-bis(4-(meth)acryloxytetraethoxyphenyl)propane and 2,2-bis(4-(meth)acryloxypolyethoxyphenyl)propane. One or more of them may be used. Among these, 2,2-bis(4-(meth)acryloxypolyethoxyphenyl)propane is preferred from the viewpoint of the bonding property.

Further, p is from 0 to 8, preferably from 5 to 7. If it exceeds 8, the bonding property tends to be low.

③ A (meth)acrylate of a higher alcohol Such a (meth)acrylic monomer may, for example, be a (meth)acrylate of a higher aliphatic alcohol, such as 2-ethylhexyl (meth)acrylate, lauryl (meth)acrylate or stearyl (meth)acrylate, and a (meth)acrylate of a monoether alcohol, such as dicyclopentanyloxyalkyl (meth)acrylate, dicyclopentenyloxyalkyl (meth)acrylate or ethylene glycol. One or more of these monomers may be employed.

④ A (meth)acrylate of a polyhydric alcohol Such a (meth)acrylic monomer may, for example, be trimethylolpropane tri(meth)acrylate, neopentylglycol di(meth)acrylate, pentaerythritol tetra(meth)acrylate and dipentaerythritol hexa(meth)acrylate. One or more of these monomers may be employed.

⑤ A urethane prepolymer having a (meth)acryloyloxy group

Such a (meth)acrylic monomer may be obtained, for example, by reacting a (meth)acrylic monomer having a hydroxyl group, an organic polyisocyanate and a polyhydric alcohol.

Here, the (meth)acrylic monomer having a hydroxyl group may, for example, be 2-hydroxyethyl (meth)acrylate, hydroxypropyl (meth)acrylate or hydroxybutyl (meth)acrylate.

The organic polyisocyanate may, for example, be toluene diisocyanate, 4,4-diphenylmethane diisocyanate, hexamethylene diisocyanate or isophorone diisocyanate.

The polyhydric alcohol may, for example, be polyethylene glycol, polypropylene glycol, polytetramethylene glycol or polyester polyol.

⑥ A (meth)acrylic monomer having a hydroxyl group

Such a (meth)acrylic monomer may, for example, be a hydroxyalkyl (meth)acrylate such as 2-hydroxyethyl (meth)acrylate, hydroxypropyl (meth)acrylate or hydroxybutyl (meth)acrylate.

Further, the (meth)acrylic monomer having a hydroxyl group may also be a bisphenol A glycidylether (meth)acrylic acid adduct such as 3000M (manufactured by Kyoeisha Yushi Kagaku K.K.) or 3000A (manufactured by Kyoeisha Yushi Kagaku K.K.). One or more of these monomers may be employed. Among them, a hydroxyalkyl (meth)acrylate is preferred, and 2-hydroxyethyl (meth)acrylate is more preferred, from the viewpoint of the effectiveness.

Among the (meth)acrylic monomers, ① the (meth)acrylic monomer of the formula (A) and/or ② the (meth)acrylic monomer of the formula (B), is preferred from the viewpoint of the reactivity and the bonding property. It is more preferred to use ① the (meth)acrylic monomer of the formula (A) and ② the (meth)acrylic monomer of the formula (B) in combination.

The amount of ① is preferably from 20 to 85 parts by weight, more preferably from 35 to 70 parts by weight, per 100 parts by weight of the total amount of ① and ②. If it is less than 20 parts by weight, the curing time is so short that the operation efficiency tends to be low, and the bonding property tends to be low. On the other hand, if it exceeds 85 parts by weight, the curing time tends to be long, whereby the bonding property tends to be low.

The amount of ② is preferably from 15 to 80 parts by weight, more preferably from 30 to 65 parts by weight, per 100 parts by weight of the total amount of ① and ②. If it is less than 15 parts by weight, the curing time tends to be long, whereby the bonding property tends to be low. On the other hand, if it exceeds 80 parts by weight, the curing time tends to be so short that the operation efficiency tends to be low, and the bonding property tends to be low.

When aramid fibers are to be bonded by means of the curable resin composition of the present invention, it is preferred that the composition does not substantially contain ⑥. However, in order to improve the curing rate, to have cotton bonded and to improve the tensile shear strength to a metal, ⑥ may be used in a small amount. The amount of ⑥ in such a case is preferably from 0 to 5 parts by weight, more preferably from 0 to 1 part by weight, most preferably 0 part by weight, per 100 parts by weight of the component (1) except ⑥. If it exceeds 5 parts by weight, the bonding property to the aramid fibers tends to be low.

(2) The polymerization initiator to be used in the present invention, includes, for example, organic peroxides such as cumene hydroperoxide, paramethane hydroperoxide, tert-butyl hydroperoxide, diisopropylbenzene dihydroperoxide, methyl ethyl ketone peroxide, benzoyl peroxide and tert-butyl peroxybenzoate. One or more of these peroxides may be employed. Among them, cumene hydroperoxide is preferred from the reactivity with component (3) or (4).

The amount of the component (2) to be used in the present invention, is preferably from 0.5 to 10 parts by weight, more preferably from 1 to 7 parts by weight, per 100 parts by weight of the component (1). If it is less than 0.5 part by weight, the curing rate tends to be low, and if it exceeds 10 parts by weight, the storage stability tends to deteriorate.

The component (3) to be used in the present invention, may, for example, be an aromatic amine and/or a pyridine derivative. The aromatic amine may, for example, be N,N-dimethylaniline, N,N-dimethyl-para-toluidine or N,N-dioxyethyl-para-toluidine. The pyridine derivative may, for example, be 2,4-pyridine diamine. One or more of these compounds may be used. Among them, an aromatic amine is preferred, and N,N-dimethylaniline is more preferred, from the viewpoint of the reactivity with the component (2).

The amount of the component (3) is preferably from 0.05 to 5 parts by weight, more preferably from 0.1 to 1 part by weight, per 100 parts by weight of the component (1). If it is less than 0.05 part by weight, the curing rate tends to be low, and the bonding property particularly to the aramid fibers or cotton tends to be small, and if it exceeds 5 parts by weight, the storage stability tends to deteriorate.

The component (4) to be used in the present invention, may, for example, be a β-diketone chelate and/or a β-keto-ester. The β-diketone chelate may, for example, be vanadyl acetylacetonate, cobalt acetylacetonate or copper acetylacetonate. The β-keto-ester may, for example, be vanadyl naphthenate or vanadyl stearate. One or more of these compounds may be employed. Among them, a metal salt having a reducing property is preferred, a β-diketone chelate is more preferred, vanadyl acetylacetonate is most preferred, from the viewpoint of the reactivity with the component (2).

The amount of the component (4) is preferably from 0.05 to 5 parts by weight, more preferably from 0.1 to 1 part by weight, per 100 parts by weight of the component (1). If it is less than 0.05 part by weight, the curing rate is low, and the bonding property tends to be small. If it exceeds 5 parts by weight, an unreacted component will remain, and the bonding property tends to be low.

(5) The phosphate to be used in the present invention is an acid phosphate compound of the following formula (C):

(C)

wherein R is $CH_2=CR_4CO(OR_5)_m$—(wherein $R_4$ is hydrogen or a methyl group, $R_5$ is $-C_2H_4-$, $-C_3H_6-$, $-CH_2CH(CH_3)-$, $-C_4H_8-$, $-C_6H_{12}-$ or and m is an integer of from 1 to 10), and n is an integer of 1 or 2.

The component (5) may, for example, be acid phosphoxyethyl (meth)acrylate, acid phosphoxypropyl (meth)acrylate or bis (2-(meth)acryloyloxyethyl) phosphate. one or more of these compounds may be employed. Among them, acid phosphoxyethyl methacrylate is preferred from the viewpoint of the effectiveness.

The amount of the component (5) is preferably from 0.05 to 10 parts by weight, more preferably from 0.1 to 7 parts by weight, per 100 parts by weight of the component (1). If it is less than 0.05 part by weight, the curing rate tends to be low, and the bonding property particularly to aramid fibers or cotton tends to be small. If it exceeds 10 parts by weight, the bonding property tends to be low.

In the present invention, it is preferred to use (6) the elastomer component in order to improve the peel strength and impact strength.

(6) The elastomer component means a polymer material having rubber elasticity at room temperature, and it is preferably one which can be dissolved or dispersed in the (meth)acrylic monomer.

Such (6) an elastomer component includes, for example, various synthetic rubbers such as an acrylonitrile-butadiene-methacrylic acid copolymer, an acrylonitrile-butadiene-methyl methacrylate copolymer, a methyl methacrylate-butadiene-styrene copolymer (MBS), an acrylonitrile-styrene-butadiene copolymer, an acrylonitrile-butadiene rubber, linear polyurethane, a styrene-butadiene rubber, chloroprene rubber and butadiene rubber, natural rubbers, a styrene type thermoplastic elastomer such as a styrene-polybutadiene-styrene type synthetic rubber, an olefin type thermoplastic elastomer such as a polyethylene-EPDM synthetic rubber, a urethane type thermoplastic elastomer such as caprolactone type, adipate type or PTMG type, a polyester type thermoplastic elastomer such as a polybutylene terephthalate-polytetramethylene glycol multiblock copolymer, a polyamide type thermoplastic elastomer such as a nylon-polyol block copolymer or a nylon-polyester block copolymer, a 1,2-polybutadiene type thermoplastic elastomer, and a vinyl chloride type thermoplastic elastomer. These elastomer components may be used alone or in combination as a mixture of two or more of them so long as the compatibility is good.

Further, a terminal-methacryl-modified polybutadiene may also be used.

Among them, from the viewpoint of the bonding property and the solubility in the (meth)acrylic monomer, a methyl methacrylate-butadiene-styrene copolymer and/or an acrylonitrile-butadiene rubber is preferred, and it is more preferred to use a methyl methacrylate-butadiene-styrene copolymer and an acrylonitrile-butadiene rubber in combination.

The amount of the component (6) is preferably from 5 to 35 parts by weight, more preferably from 10 to 30 parts by weight, per 100 parts by weight of the component (1). If it is less than 5 parts by weight, the viscosity and the bonding property tend to be low, and if it exceeds 35 parts by weight, the bonding property to aramid fibers or cotton tends to be low, and the viscosity tends to be so high that the operation efficiency tends to be poor.

Further, for the purpose of adjusting the viscosity or fluidity, a thermoplastic polymer such as chlorosulfonated polyethylene, polyurethane, a styrene-acrylonitrile copolymer or a polymethyl methacrylate, as well as fine powdery silica, may also be used.

In order to facilitate curing of the portion of the curable resin composition which is in contact with air, various paraffins may be incorporated to the curable resin composition of the present invention. As such paraffins, paraffin wax, microcrystalline wax, carnauba wax, bees wax, lanoline, spermaceti, ceresin and candelilla wax may, for example, be mentioned. The amount of such a paraffin is preferably from 0.1 to 5 parts by weight, more preferably from 0.3 to 2.5 parts by weight, per 100 parts by weight of the component (1). If it is less than 0.1 part by weight, curing of the portion which is in contact with air tends to be poor, and if it exceeds 5 parts by weight, the bonding strength tends to be low.

Further, for the purpose of improving the storage stability, various antioxidants including polymerization inhibitors, may be employed. Antioxidants include, for example, hydroquinone, hydroquinone monomethyl ether, 2,6-di-tert-butyl-p-cresol, 2,2'-methylenebis(4-methyl-6-tert-butylphenol), triphenylphosphite, phenothiazine and N-isopropyl-N'-phenyl-p-phenylenediamine.

The amount of the polymerization inhibitor is preferably from 0.001 to 3 parts by weight, more preferably from 0.01 to 1 part by weight, per 100 parts by weight of the components (1). If it is less than 0.001 part by weight, no adequate effects will be obtained, and if it exceeds 3 parts by weight, the cured strength tends to be poor.

In addition to these, known materials such as a plasticizer, a filler, a colorant and a rust-preventing agent may also be incorporated as the case requires.

The curable resin composition of the present invention can be used for bonding reinforced fibers such as aramid fibers, carbon fibers, glass fibers and polyvinyl alcohol fibers, metals, papers, cotton and glass. Among them, from the viewpoint of the bonding property, it is preferably used for bonding reinforced fibers, metals and cotton, and it is more preferably employed for bonding reinforced fibers or cotton. Most preferably, it is used for bonding reinforced fibers.

Among the reinforced fibers, it can be suitably used for carbon fibers and aramid fibers. More preferably, it is used for aramid fibers.

Further, among metals, it can be used preferably for iron.

Aramid fibers have a characteristic that the heat resistance is high. When used for a speaker, they provide high heat resistance, whereby the sound effects of the speaker will not deteriorate even at a high temperature.

Aramid fibers are classified into a para type and a meta type depending upon the bonding position of the aromatic ring. Either type may be used for the curable resin composition of the present invention. However, the meta type is preferred.

Para type aramid fibers may be classified into a homopolymer (polyparaphenylene terephthalamide) and a copolymer (copolyparaphenylene/3,4'-dipnenyloxyterephthalamide) depending upon their chemical structure. As the homopolymer, "Kevlar", tradename, manufactured by Du Pont, or "Twaron", tradename, manufactured by Aczo, may, for example, be mentioned. As the copolymer, "Technora", tradename, manufactured by Teijin, may, for example, be mentioned.

As the meta type aramid fibers, "Nomex", tradename, manufactured by Du Pont, or "Conex", tradename, manufactured by Teijin, may, for example, be mentioned as a homopolymer (polymetaphenylene isophthalamide).

When the curable resin composition of the present invention is to be used as an adhesive composition for aramid fibers, it may be used not only for bonding aramid fibers to one another, but also for bonding an adherend made of aramid fibers to an adherend made of metal or paper i.e. for bonding aramid fibers to a material different from the aramid fibers.

It is particularly preferred to assemble a speaker by bonding a damper made of aramid fibers and a voice coil and/or a frame, from the viewpoint of the durability, particularly excellent heat resistance, of a high power speaker or a speaker to be mounted on an automobile.

Further, as a voice coil, preferred is one having a paper tape wound on a cylindrical thick paper or aluminum sheet. As the material for a frame, preferred is a plastic or a metal, and most preferred is a metal.

As the damper for a speaker, cotton is still used in most cases, since it is inexpensive. It is industrially advantageous that the curable resin composition of the present invention is excellent in the bonding property not only to aramid fibers but also to cotton.

As a practical embodiment of the present invention, the curable resin composition may be used as a two-pack type adhesive composition. In the case of the two-pack type adhesive composition, not all of the essential components of the adhesive composition of the present invention are mixed for storage. Namely, the adhesive composition is divided into a first pack and a second pack, and at least the component (2) is stored in the first pack, and at least the components (3) and (4) are stored in the second pack. Further, the component (5) is preferably stored in the second pack. In such a case, the two packs may simultaneously or separately be coated for contact and curing on the adherends and thereby used as a two-pack type adhesive composition.

As another practical embodiment, the (meth)acrylic monomer and other optional components may preliminarily be incorporated in either one or both of the first and second packs, and the two packs are mixed at the time of use and thus may be used as a one-pack type adhesive composition.

Among these embodiments, it is preferred to employ the composition as a two-pack type adhesive composition from the viewpoint of the excellent storage stability.

Now, the present invention will be described in further detail with reference to Examples. However, it should be understood that the present invention is by no means restricted to such specific Examples.

EXAMPLES

In the following Examples, the amounts of various materials used are represented by parts by weight. Further, the following abbreviations will be used for the respective materials.

Materials Used
Methyl methacrylate: commercial product
2-Ethylhexyl methacrylate: commercial product
2,2-Bis(4-methacryloxypolyethoxyphenyl)propane: commercial product, one having the formula (B) wherein p=5.
2,2-Bis(4-methacryloxyethoxyphenyl)propane: commercial product
2-Hydroxyethyl methacrylate: commercial product
Cumene hydroperoxide: commercial product
N,N-dimethylaniline: commercial product
Vanadyl acetylacetonate: commercial product
Vanadyl naphthenate: commercial product
Phosphate 1: commercial product, acid phosphoxyethyl methacrylate
Phosphate 2: commercial product, acid phosphoxypropyl methacrylate
Methyl methacrylate-butadiene-styrene copolymer: commercial product
Acrylonitrile-butadiene rubber: commercial product, high nitrile NBR
Paraffins: commercial product, paraffin wax
Polymerization inhibitor: hydroquinone monomethyl ether, commercial product
SPCC: commercial product, SPCC-D blast treated steel sheet
Cotton: commercial product, cotton cloth, cellulose
Aramid fibers: "Conex", tradename, manufactured by Teijin Ltd.
Carbon fibers: commercial product The physical properties were measured as follows.

Curing Time

In accordance with JIS K-6856, a mixture of first and second packs in equal amounts was coated on one of test specimens (100 mm×25 mm×1.6 mm in thickness, SPCC-D sand blast treated), and then, another test specimen was overlaid and bonded thereto to obtain a sample.

As the curing time (unit: minutes) of the sample, the time was measured from immediately after bonding until the strength of at least 0.4 MPa was measured by pulling by a push pull gauge (Model S, manufactured by Komura K.K.) in an environment with a humidity of 50% at a temperature of 23° C.

SPCC/SPCC Tensile Shear Strength

In accordance with JIS K-6856, a mixture of first and second packs in equal amounts, was coated on one of test specimens (100 mm×25 mm×1.6 mm in thickness, SPCC-D sand blast treated), and then, another test specimen was immediately overlaid and bonded thereto, followed by aging at room temperature for 24 hours to obtain a sample.

The tensile shear strength (unit: MPa) of the sample was measured at a tensile rate of 10 mm/mn in an environment with t humidity of 50% at a temperature of 23° C.

SPCC/SPCC Tensile Peel Strength

In accordance with JIS K-6854, a mixture of first and second packs in equal amounts, was coated on one of test specimens (70 mm×25 mm×0.3 mm in thickness, SPCC-D sand blast treated), and then another test specimen was immediately overlaid and bonded thereto, followed by aging at room temperature for 24 hours to obtain a sample.

The peel strength (T-form peel strength, unit: kN/m) of the sample was measured at a tensile rate of 50 mm/min in an environment with a humidity of 50% at a temperature of 23° C.

Cotton/cotton Peel Strength

Measurement was carried out in the same manner as fox the SPCC/SPCC peel strength except that a mixture of first and second packs in equal amounts, was coated on one of test specimens (JIS L-3102 normal cotton cloth No. 1209-9: 70 mm×25 mm×0.7 mm in thickness, non-treated), and then another test specimen was immediately overlaid and bonded thereto.

Carbon Fiber/carbon Fiber Peel Strength

Measurement was carried out in the same manner as for the SPCC/SPCC peel strength except that in accordance with JIS K-6854, a mixture of first and second packs in equal amounts was coated on one of test specimens (carbon fibers: 70 mm×25 mm×0.17 mm in thickness, non-treated), and then another test specimen was immediately overlaid and bonded thereto.

Bond Strength of the Three Parts of a Speaker

Figure 3:
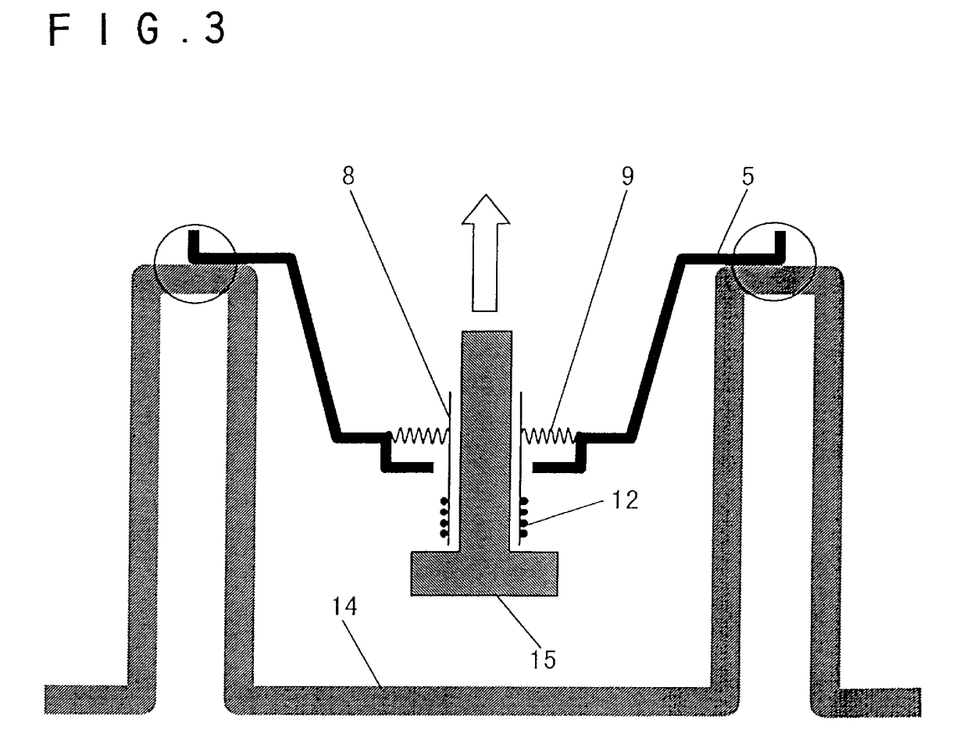
FIG. 3 is a cross-sectional view showing the method for measuring the bond strength of the three parts of the speaker.

A test was carried out under a condition of 23° C. with a relative humidity of 50%. A speaker as shown in FIG. 1 was assembled. As the material for a damper 9 (outer diameter of 60 mm×inner diameter of 20 mm×thickness of 0.25 mm), cotton or aramid fibers were used. To such materials, a phenolic thermosetting resin composition was impregnated and hot-molded into the shape of a damper 9 as shown in FIG. 1. Further, as the material for a frame 4, iron having its surface subjected to chromate plating, was employed. The obtained damper 9 and a voice coil 8 (made of aluminum) having a paper tape 11 and a coil 12 wound thereon as shown in FIG. 2, were bonded via a portion where the bonding portion of the voice coil was paper (the portion indicated by a circle in FIG. 2), and the damper 9 and the frame 5 were bonded to obtain a speaker as shown in FIG. 3 (the paper tape 11 and the adhesive composition 13 are not shown) to obtain a sample for measuring the strength. As the bonding method, a method was employed wherein a mixture of first and second packs in equal amounts was coated in an amount of about 0.2 g on the bonding portion, followed by aging at room temperature for 24 hours for bonding.

The bonding strength (unit: kg) of the three parts of a speaker was measured in an environment with a humidity of 50% at a temperature of 23° C. A voice coil tensile jig 15 was inserted at the center of the voice coil 8, and the periphery 5 of the frame was fixed to the periphery of a frame fixing jig 14 (the portion indicated by a circle in FIG. 3). The voice coil tensile jig 15 was pulled at a tensile rate of 100 mm/min in the direction of the arrow, whereby the bond strength of the three parts of the speaker was measured.

Viscosity

In accordance with JIS K-7117, 50 ml of each of first and second packs was taken and left to stand for 24 hours in a constant temperature tank at 25° C. to obtain a sample. The viscosity was measured continuously for 2 minutes at 25° C. by a single cylindrical rotary viscometer.

Test Example 1

The respective materials were mixed in the amounts as identified in Table 1 to obtain adhesive compositions comprising first and second packs. The results of measurements are also shown in Table 1.

TABLE 1

|  | Test No. | | | |
| --- | --- | --- | --- | --- |
|  | 1-1 | 1-2 | 1-3 | 1-4 |
| Amounts (unit: parts by weight) | | | | |
| 1st pack | | | | |
| (1) Methyl methacrylate | 60 | 60 | 60 | 60 |
|   2,2-Bis(4-methacryloxypolyethoxyphenyl)-propane | 40 | 40 | 40 | 40 |
| (2) Cumene hydroperoxide | 5 | 5 | 5 | 5 |
| (6) Methyl methacrylate-butadiene-styrene copolymer | 7.5 | 7.5 | 7.5 | 7.5 |
|   Acrylonitrile butadiene rubber | 7.5 | 7.5 | 7.5 | 7.5 |
|   Paraffins | 0.5 | 0.5 | 0.5 | 0.5 |
|   Polymerization inhibitor | 0.2 | 0.2 | 0.2 | 0.2 |
| 2nd pack | | | | |
| (1) Methyl methacrylate | 60 | 60 | 60 | 60 |
|   2,2-Bis(4-methacryloxypolyethoxyphenyl)-propane | 40 | 40 | 40 | 40 |
| (3) N,N-dimethylaniline | 0.5 | 0 | 0.5 | 0.5 |
| (4) Vanadyl acetylacetonate | 0.5 | 0.5 | 0 | 0.5 |
| (5) Phosphate 1 | 5 | 5 | 5 | 0 |
| (6) Methyl methacrylate-butadiene-styrene copolymer | 7.5 | 7.5 | 7.5 | 7.5 |
|   Acrylonitrile-butadiene rubber | 7.5 | 7.5 | 7.5 | 7.5 |
|   Paraffins | 0.5 | 0.5 | 0.5 | 0.5 |
| Evaluation | | | | |
| Curing time (min) | 5.5 | 11.0 | *1 | 15.0 |
| SPCC/SPCC tensile shear strength (MPa) | 33.3 | 31.5 |  | 25.7 |
| SPCC/SPCC peel strength (kN/m) | 4.8 | 4.1 |  | 4.5 |
| Cotton/cotton peel strength (kN/m) | 2.6 | 1.3 |  | <0.1 |
| Bond strength of three parts of a speaker (damper made of aramid fibers) (kg) | 25.0 | 18.0 |  | 7.0 |

TABLE 1-continued

|  | Test No. | | | |
| --- | --- | --- | --- | --- |
|  | 1-1 | 1-2 | 1-3 | 1-4 |
| Note | Invention | Comparative | Comparative | Comparative |

*1: In Test No. 1-3, no curing was observed, whereby evaluation of the physical properties was impossible.

Further, with respect to test No. 1-1 and No. 1-4, carbon fiber/carbon fiber peel strength was measured to investigate the bonding properties to the carbon fibers. The results of measurements are shown in Table 2.

TABLE 2

|  | Test No. | 1-1 | 1-4 |
| --- | --- | --- | --- |
| Evaluation | Carbon fiber/carbon fiber peel strength (kN/in) | >2.4 *2 | <1.0 |

TABLE 2-continued

| Test No. | 1-1 | 1-4 |
| --- | --- | --- |
| Note | Invention | Comparative |

*2: No. 1-1 underwent cohesive failure.

Test Example 2

The respective materials were mixed in the amounts as identified in Table 3 to obtain adhesive compositions comprising first and second packs. The results of measurements are also shown in Table 3.

TABLE 3

|  | Test No. | | | | | | |
| --- | --- | --- | --- | --- | --- | --- | --- |
|  | 2-1 | 2-2 | 2-3 | 1-1 | 2-4 | 2-5 | 2-6 |
| Amounts (unit: parts by weight) | | | | | | | |
| 1st pack | | | | | | | |
| (1) Methyl methacrylate | 0 | 20 | 35 | 60 | 70 | 85 | 100 |
| 2,2-Bis(4-methacryloxypolyethoxyphenyl)-propane | 100 | 80 | 65 | 40 | 30 | 15 | 0 |
| (2) Cumene hydroperoxide | 5 | 5 | 5 | 5 | 5 | 5 | 5 |
| (6) Methyl methacrylate-butadiene-styrene copolymer | 7.5 | 7.5 | 7.5 | 7.5 | 7.5 | 7.5 | 7.5 |
| Acrylonitrile-butadiene rubber | 7.5 | 7.5 | 7.5 | 7.5 | 7.5 | 7.5 | 7.5 |
| Paraffins | 0.5 | 0.5 | 0.5 | 0.5 | 0.5 | 0.5 | 0.5 |
| Polymerization inhibitor | 0.2 | 0.2 | 0.2 | 0.2 | 0.2 | 0.2 | 0.2 |
| 2nd pack | | | | | | | |
| (1) Methyl methacrylate | 0 | 20 | 35 | 60 | 70 | 85 | 100 |
| 2,2-Bis(4-methacryloxypolyethoxyphenyl)-propane | 100 | 80 | 65 | 40 | 30 | 15 | 0 |
| (3) N,N-dimethylaniline | 0.5 | 0.5 | 0.5 | 0.5 | 0.5 | 0.5 | 0.5 |
| (4) Vanadyl acetylacetonate | 0.5 | 0.5 | 0.5 | 0.5 | 0.5 | 0.5 | 0.5 |
| (5) Phosphate 1 | 5 | 5 | 5 | 5 | 5 | 5 | 5 |
| (6) Methyl methacrylate-butadiene-styrene copolymer | 7.5 | 7.5 | 7.5 | 7.5 | 7.5 | 7.5 | 7.5 |
| Acrylonitrile-butadiene rubber | 7.5 | 7.5 | 7.5 | 7.5 | 7.5 | 7.5 | 7.5 |
| Paraffins | 0.5 | 0.5 | 0.5 | 0.5 | 0.5 | 0.5 | 0.5 |
| Evaluation | | | | | | | |
| Curing time (min) | <3.5 | 3.5 | 4.5 | 5.5 | 7.0 | 10.5 | >20.0 |
| SPCC/SPCC tensile shear strength (MPa) | 16.0 | 26.0 | 30.0 | 33.3 | 34.0 | 32.0 | 21.0 |
| SPCC/SPCC peel strength (kN/m) | 2.7 | 4.3 | 4.5 | 4.8 | 5.1 | 4.7 | 2.7 |
| Cotton/cotton peel strength (kN/m) | 1.8 | 2.4 | 2.6 | 2.6 | 2.5 | 2.0 | 1.1 |
| Bond strength of three parts of a speaker (damper made of cotton) (kg) | 17.0 | 20.0 | 23.0 | 20.0 | 24.0 | 22.0 | 17.0 |
| Bond strength of three parts of a speaker (damper made of aramid fibers) (kg) | 11.0 | 18.0 | 23.0 | 25.0 | 18.0 | 19.0 | 11.0 |

Test Example 3

The respective materials were mixed in the amounts as identified in Table 4 to obtain adhesive compositions comprising first and second packs. The results of measurements are also shown in Table 4.

TABLE 4

| | Test No. | | | | | | |
|---|---|---|---|---|---|---|---|
| | 3-1 | 3-2 | 3-3 | 1-1 | 3-4 | 3-5 | 3-6 |
| Amounts (unit: parts by weight) | | | | | | | |
| 1st pack | | | | | | | |
| (1) Methyl methacrylate | 60 | 60 | 60 | 60 | 60 | 60 | 60 |
| 2,2-Bis(4-methacryloxypolyethoxyphenyl)-propane | 40 | 40 | 40 | 40 | 40 | 40 | 40 |
| (2) Cumene hydroperoxide | 5 | 5 | 5 | 5 | 5 | 5 | 5 |
| (6) Methyl methacrylate-butadiene-styrene copolymer | 0 | 2.5 | 5.0 | 7.5 | 0 | 15.0 | 17.5 |
| Acrylonitrile-butadiene rubber | 0 | 2.5 | 5.0 | 7.5 | 15.0 | 15.0 | 17.5 |
| Paraffins | 0.5 | 0.5 | 0.5 | 0.5 | 0.5 | 0.5 | 0.5 |
| Polymerization inhibitor | 0.2 | 0.2 | 0.2 | 0.2 | 0.2 | 0.2 | 0.2 |
| 2nd pack | | | | | | | |
| (1) Methyl methacrylate | 60 | 60 | 60 | 60 | 60 | 60 | 60 |
| 2,2-Bis(4-methacryloxypolyethoxyphenyl)-propane | 40 | 40 | 40 | 40 | 40 | 40 | 40 |
| (3) N,N-dimethylaniline | 0.5 | 0.5 | 0.5 | 0.5 | 0.5 | 0.5 | 0.5 |
| (4) Vanadyl acetylacetonate | 0.5 | 0.5 | 0.5 | 0.5 | 0.5 | 0.5 | 0.5 |
| (5) Phosphate 1 | 5 | 5 | 5 | 5 | 5 | 5 | 5 |
| (6) Methyl methacrylate-butadiene-styrene copolymer | 0 | 2.5 | 5.0 | 7.5 | 0 | 15.0 | 17.5 |
| Acrylonitrile-butadiene rubber | 0 | 2.5 | 5.0 | 7.5 | 15.0 | 15.0 | 17.5 |
| Paraffins | 0.5 | 0.5 | 0.5 | 0.5 | 0.5 | 0.5 | 0.5 |
| Evaluation | | | | | | | |
| Cotton/cotton peel strength (kN/m) | <0.1 | 1.5 | 2.4 | 2.6 | 2.6 | 2.5 | |
| Bond strength of three parts of a speaker (damper made of aramid) fibers (kg) | 19.0 | 21.0 | 24.0 | 25.0 | 23.0 | 19.0 | 11.0 |
| Viscosity (1st pack) (cps) | 500 | 1500 | 3000 | 5000 | 6000 | 20000 | 30000 |
| Viscosity (2nd pack) (cps) | 500 | 1500 | 3000 | 5000 | 6000 | 20000 | 30000 |

Test Example 4

The respective materials were mixed in the amounts as identified in Table 5 to obtain adhesive compositions comprising first and second packs. The results of measurements are also shown in Table 5.

TABLE 5

| | Test No. | | | | |
|---|---|---|---|---|---|
| | 1-1 | 4-1 | 4-2 | 4-3 | 4-4 |
| Amounts (unit: parts by weight) | | | | | |
| 1st pack | | | | | |
| (1) Methyl methacrylate | 60 | | 60 | 60 | 60 |
| 2-Ethylhexyl methacrylate | | 60 | | | |
| 2,2-Bis(4-methacryloxypolyethoxyphenyl) propane | 40 | 40 | | 40 | 40 |
| 2,2-Bis(4-methacryloxyethoxy-phenyl)-propane | | | 40 | | |
| (2) Cumene hydroperoxide | 5 | 5 | 5 | 5 | 5 |
| (6) Methyl methacrylate-butadiene-styrene-copolymer | 7.5 | 7.5 | 7.5 | 7.5 | 7.5 |
| Acrylonitrile-butadiene rubber | 7.5 | 7.5 | 7.5 | 7.5 | 7.5 |
| Paraffins | 0.5 | 0.5 | 0.5 | 0.5 | 0.5 |
| Polymerization inhibitor | 0.2 | 0.2 | 0.2 | 0.2 | 0.2 |
| 2nd pack | | | | | |
| (1) Methyl methacrylate | 60 | | 60 | 60 | 60 |
| 2-Ethylhexyl methacrylate | | 60 | | | |
| 2,2-Bis(4-methacryloxypolyethoxyphenyl)-propane | 40 | 40 | | 40 | 40 |
| 2,2-Bis(4-methacryloxyethoxy-phenyl)-propane | | | 40 | | |
| (3) N,N-dimethylaniline | 0.5 | 0.5 | 0.5 | 0.5 | 0.5 |
| (4) Vanadyl acetylacetonate | 0.5 | 0.5 | 0.5 | | 0.5 |
| Vanadyl naphthenate | | | | 0.5 | |
| (5) Phosphate 1 | 5 | 5 | 5 | 5 | |
| Phosphate 2 | | | | | 5 |

TABLE 5-continued

| | Test No. | | | | |
|---|---|---|---|---|---|
| | 1-1 | 4-1 | 4-2 | 4-3 | 4-4 |
| (6) Methyl-methacrylate-butadiene-styrene copolymer | 7.5 | 7.5 | 7.5 | 7.5 | 7.5 |
| Acrylonitrile-butadiene rubber | 7.5 | 7.5 | 7.5 | 7.5 | 7.5 |
| Paraffins | 0.5 | 0.5 | 0.5 | 0.5 | 0.5 |
| Evaluation | | | | | |
| Curing time (min) | 5.5 | 7.0 | 5.0 | 5.5 | 5.5 |
| SPCC/SPCC tensile shear strength (MPa) | 33.3 | 22.0 | 34.5 | 31.0 | 30.0 |
| SPCC/SPCC peel strength (kN/m) | 4.8 | 2.8 | 3.5 | 4.5 | 4.5 |
| Cotton/cotton peel strength (kN/m) | 2.6 | 1.2 | 2.0 | 2.5 | 2.4 |
| Bond strength of three parts of a speaker (damper made of aramid fibers) (kg) | 25.0 | 15.0 | 18.0 | 20.0 | 20.0 |

Test Example 5

The respective materials were mixed in the amounts as identified in Table 6 to obtain adhesive compositions comprising first and second packs. The results of measurements are also shown in Table 6.

TABLE 6

| | Amounts (unit: parts by weight) | | | |
|---|---|---|---|---|
| | Test No. | 1-1 | 5-1 | 5-2 |
| 1st pack | | | | |
| (1) | Methyl methacrylate | 60 | 60 | 60 |
| | 2,2-Bis (4-methacryloxypolyethoxyphenyl)-propane | 40 | 40 | 40 |
| | 2-Hydroxyethyl methacrylate | 0 | 1 | 5 |
| (2) | Cumene hydroperoxide | 5 | 5 | 5 |
| (6) | Methyl methacrylate-butadiene-styrene copolymer | 7.5 | 7.5 | 7.5 |
| | Acrylonitrile-butadiene rubber | 7.5 | 7.5 | 7.5 |
| | Paraffins | 0.5 | 0.5 | 0.5 |
| | Polymerization inhibitor | 0.2 | 0.2 | 0.2 |
| 2nd pack | | | | |
| (1) | Methyl methacrylate | 60 | 60 | 60 |
| | 2,2-Bis(4-methacryloxypolyethoxyphenyl)-propane | 40 | 40 | 40 |
| | 2-Hydroxyethyl methacrylate | 0 | 1 | 5 |
| (3) | N,N-dimethylaniline | 0.5 | 0.5 | 0.5 |
| (4) | Vanadyl acetacetonate | 0.5 | 0.5 | 0.5 |
| (5) | Phosphate 1 | 5 | 5 | 5 |
| (6) | Methyl methacrylate-butadiene-styrene copolymer | 7.5 | 7.5 | 7.5 |
| | Acrylonitrile-butadiene rubber | 7.5 | 7.5 | 7.5 |
| | Paraffins | 0.5 | 0.5 | 0.5 |
| Evaluation | | | | |
| Curing time (min) | | 5.5 | 5.5 | 5.0 |
| SPCC/SPCC tensile shear strength (MPa) | | 33.3 | 33.8 | 34.4 |
| SPCC/SPCC peel strength (kN/m) | | 4.8 | 4.6 | 4.3 |
| Cotton/cotton peel strength (kN/m) | | 2.6 | 2.6 | 2.7 |
| Bond strength of three parts of a speaker (damper made of cotton) (kg) | | 20.0 | 20.5 | 21.6 |
| Bond strength of three parts of a speaker (damper made of aramid fibers) (kg) | | 25.0 | 22.0 | 17.0 |

By the adhesive composition of the present invention, a bonded product can be obtained which is excellent in the bonding property to adherends such as metals, reinforced fibers or cotton. In particular, a bonded product can be obtained which is particularly excellent in the bonding property to aramid fibers having heat resistance. A bonded product employing aramid fibers is excellent in durability at a high temperature, and when it is used for a speaker, sound characteristics will not deteriorate, and its industrial merit is substantial.

What is claimed is:

1. A curable resin composition comprising (1) 100 parts by weight of a polymerizable vinyl monomer, (2) from 0.5 to 10 parts by weight of a polymerization initiator, (3) from 0.05 to 5 parts by weight of an aromatic amine and/or a pyridine derivative, (4) from 0.05 to 5 parts by weight of a β-diketone chelate and/or a β-keto-ester, (5) from 0.05 to 10 parts by weight of a phosphate, and (6) from 5 to 35 parts by weight of an elastomer component;

wherein (1) the polymerizable vinyl monomer comprises from 20 to 85 parts by weight of a (meth)acrylic monomer of the formula (A) and 15 to 80 parts by weight of a (meth)acrylic monomer of the formula (B) per 100 parts by weight of the total amount of (A) and (B):

$$Z-O-R_1 \quad (A)$$

wherein Z is a (meth)acryloyl group, and $R_1$ is a $C_{1-10}$ alkyl group, (B)

$$Z-O-(R_2O)_p-C_6H_4-\underset{R_3}{\overset{R_3}{C}}-C_6H_4-O-(R_2O)_p-Z$$

wherein Z is as defined above, $R_2$ is $-C_2H_4-$, $-C_3H_6-$, $-CH_2CH(CH_3)-$, $-C_4H_8-$ or $-C_6H_{12}-$, $R_3$ is hydrogen or a $C_{1-4}$ alkyl group, and p is an integer of from 0 to 8.

2. The curable resin composition according to claim 1, wherein (1) the polymerizable vinyl monomer is a (meth)acrylic monomer.

3. The curable resin composition according to claim 1, wherein (3) the aromatic amine and/or the pyridine derivative is N,N-dimethylaniline.

4. The curable resin composition according to claim 1, wherein (4) the β-diketone chelate and/or the β-keto-ester is vanadyl acetylacetonate.

5. The curable resin composition according to claim 1, wherein (5) the phosphate is an acid phosphate compound of the formula (C):

(C)

$$(R-O)_n-\overset{O}{\underset{\|}{P}}-(OH)_{3-n}$$

wherein R is $CH_2=CR_4CO(OR_5)_m-$ (wherein $R_4$ is hydrogen or a methyl group, $R_5$ is $-C_2H_4-$, $-C_3H_6-$, $-CH_2CH(CH_3)-$, $-C_4H_8-$, $-C_6H_{12}-$ or $$-C_2H_4-O\overset{\|}{\underset{O}{C}}C_5H_{10}-,$$

and m is an integer of from 1 to 10), and n is an integer of 1 or 2.

6. The curable resin composition according to claim 1, wherein (5) the phosphate is acid phosphoxyethyl methacrylate.

7. The curable resin composition according to claim 1, wherein said composition contains from 0 to 5 parts by weight per 100 parts by weight of (1) a (meth)acrylic monomer having a hydroxyl group.

8. The curable resin composition according to claim 1, which is a two-pack type composition comprising a first pack containing at least the component (2) and a second pack containing at least the components (3) and (4).

9. An adhesive composition containing the curable resin composition as defined in claim 1.

* * * * *